United States Patent [19]

Sunder

[11] Patent Number: 6,119,481

[45] Date of Patent: Sep. 19, 2000

[54] HORIZONTAL STRUCTURED PACKING

[75] Inventor: Swaminathan Sunder, Allentown, Pa.

[73] Assignee: Air Products and Chemicals, Inc., Allentown, Pa.

[21] Appl. No.: 09/008,691

[22] Filed: Jan. 19, 1998

[51] Int. Cl.[7] .................................................. F25J 1/00
[52] U.S. Cl. ........................ 62/643; 62/906; 261/112.2; 261/DIG. 72
[58] Field of Search ..................... 62/643, 906; 261/100, 261/101, 112.2, 113, DIG. 72

[56] References Cited

U.S. PATENT DOCUMENTS

| | | | |
|---|---|---|---|
| 3,402,105 | 9/1968 | Sze | 62/906 X |
| 3,475,012 | 10/1969 | Britton et al. | 261/112.2 |
| 3,542,635 | 11/1970 | Parker | 261/112.2 X |
| 4,296,050 | 10/1981 | Meier | 261/112 |
| 4,500,583 | 2/1985 | Naul | 428/116 |
| 4,830,792 | 5/1989 | Wilhelm | 261/79.2 |
| 5,132,056 | 7/1992 | Lockett et al. | 261/112.2 |
| 5,158,712 | 10/1992 | Wilhelm | 261/79.2 |
| 5,500,160 | 3/1996 | Suess | 261/79.2 |
| 5,635,035 | 6/1997 | Koshy | 203/34 |

*Primary Examiner*—Ronald Capossela
*Attorney, Agent, or Firm*—Willard Jones, II

[57] ABSTRACT

Horizontal structured packing utilizing horizontal panels or horizontal corrugated foils arranged in a crisscrossing pattern are disclosed together with methods for manufacturing and assembling the horizontal structured packing in an exchange column. In one embodiment, the structured packing comprises at least one first layer in a generally horizontal first plane and at least one second layer in a generally horizontal second plane below the first layer, each layer having at least one generally horizontal panel in the shape of a polygon having a center. Each panel is substantially uniform in size and of a shape that nests with horizontally adjacent panels, and there are a plurality of vanes disposed inside each panel. At least one of the vanes is at an angle to the horizontal and has a passage between the vane and an adjacent vane. The center of at least one panel in the second layer is horizontally offset from the center of a vertically adjacent panel in the first layer.

44 Claims, 10 Drawing Sheets

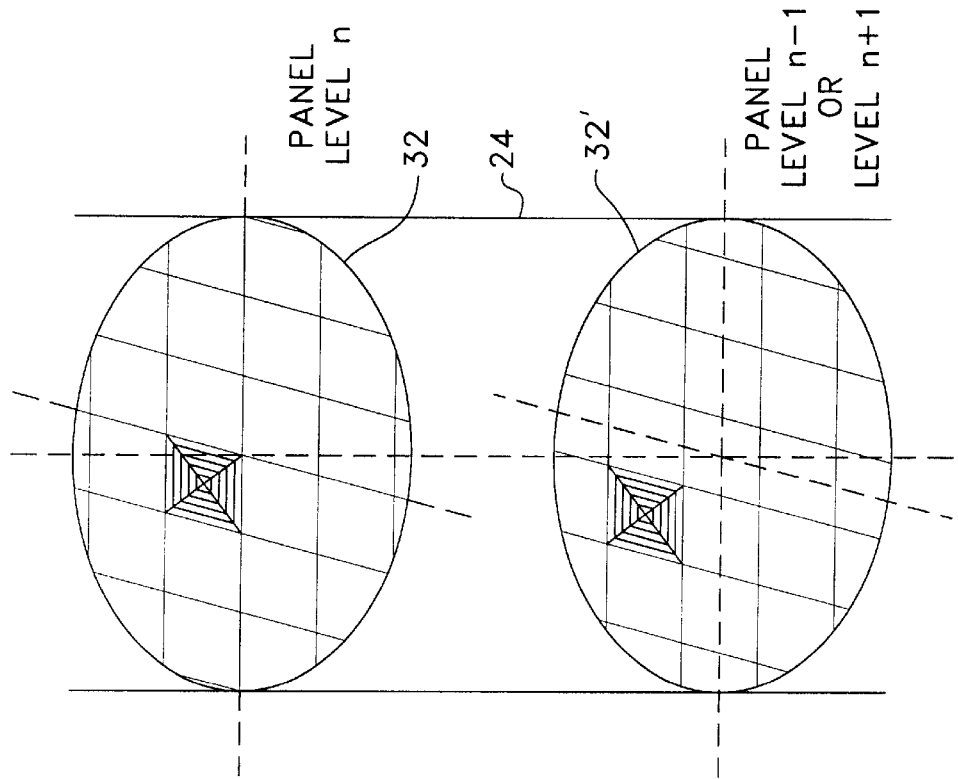
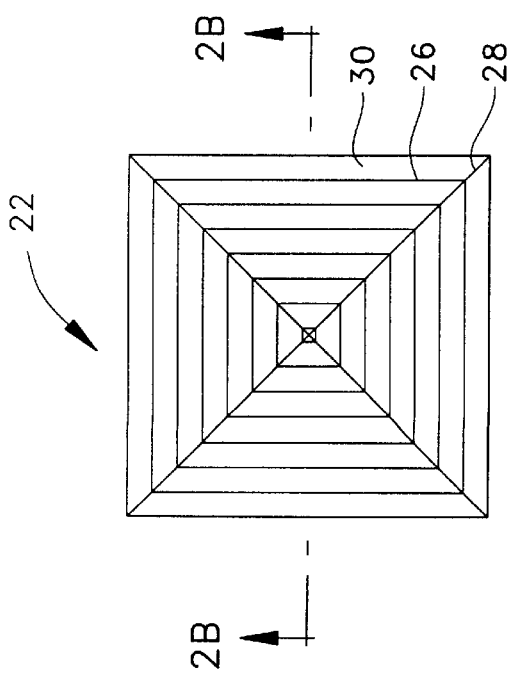
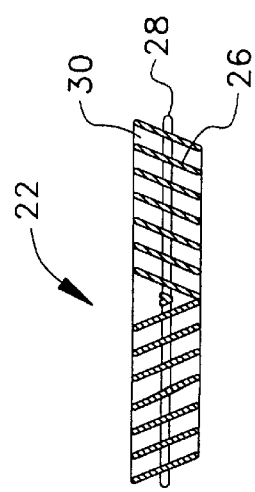
FIG. 2C
FIG. 2A
FIG. 2B

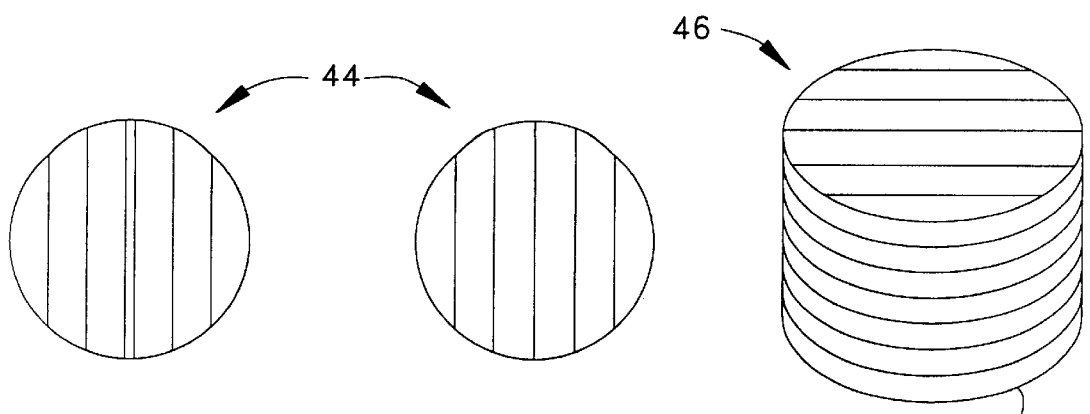
FIG. 7A    FIG. 7D    FIG. 7G
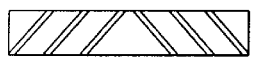    
FIG. 7B    FIG. 7E
    
FIG. 7C    FIG. 7F
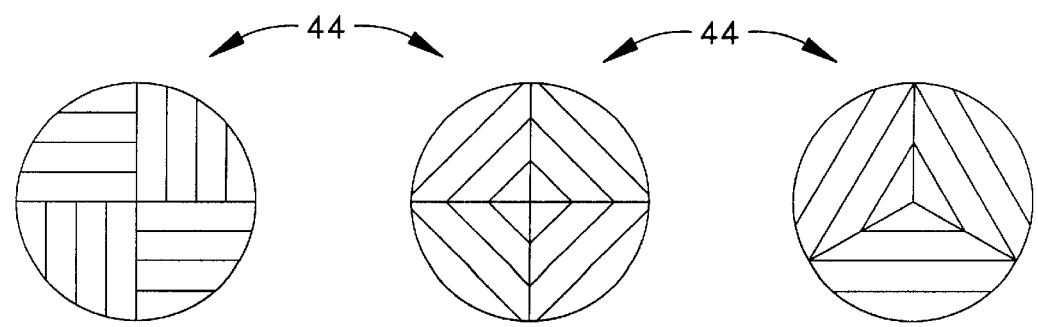
FIG. 7H    FIG. 7I    FIG. 7J

HORIZONTAL STRUCTURED PACKING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to horizontal structured packing and methods for manufacturing and assembling such packing in an exchange column. The horizontal structured packing has particular application in exchange columns, especially in cryogenic air separation processes, although it also may be used in other heat and/or mass transfer processes that can utilize structured packing.

The term, "column", as used herein, means a distillation or fractionation column or zone, i.e., a column or zone wherein liquid and vapor phases are countercurrently contacted to effect separation of a fluid mixture, such as by contacting of the vapor and liquid phases on packing elements or on a series of vertically-spaced trays or plates mounted within the column.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of expanded metal or woven wire screen stacked in layers or as spiral windings.

In processes such as distillation or direct contact cooling, it is advantageous to use structured packing to promote heat and mass transfer between counterflowing liquid and vapor streams. Structured packing, when compared with random packing or trays, offers the benefits of higher efficiency for heat and mass transfer with lower pressure drop. It also has more predictable performance than random packing.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen). Various packings or trays may be used to bring the liquid and gaseous phases of the mixture into contact to accomplish mass transfer between the phases.

There are many processes for the separation of air by cryogenic distillation into its components (i.e., nitrogen, oxygen, argon, etc.). A typical cryogenic air separation unit 10 is shown schematically in FIG. 1. High pressure feed air 1 is fed into the base of a high pressure distillation column 2. Within the high pressure column 2, the air is separated into nitrogen-enriched vapor and oxygen-enriched liquid. The oxygen-enriched liquid 3 is fed from the high pressure distillation column 2 into a low pressure distillation column 4. Nitrogen-enriched vapor 5 is passed into a condenser 6 where it is condensed to provide reboil to the low pressure column 4. The nitrogen-enriched liquid 7 is partly used as reflux for the high pressure column and partly tapped 8 as product and is partly fed 9 into the low pressure column 4 as liquid reflux. In the low pressure column 4, the feeds (3,9) are separated by cryogenic distillation into oxygen-rich and nitrogen-rich components. Structured packing 20 may be used to bring into contact the liquid and gaseous phases of the oxygen and nitrogen to be separated. The nitrogen-rich component is removed as a vapor 11. The oxygen-rich component is removed as a vapor 12. Alternatively, the oxygen-rich component can be removed from a location in the sump surrounding reboiler/condenser 6 as a liquid. A waste stream 13 also is removed from the low pressure distillation column 4. The low pressure distillation column 4 can be divided into multiple sections. Three such sections (4A, 4B, 4C) are shown in FIG. 1 by way of example.

The most commonly used structured packing consists of corrugated sheets of metal or plastic foils (or corrugated mesh cloths) stacked vertically. These foils may have various forms of apertures and/or surface roughening features aimed at improving the heat and mass transfer efficiency. An example of this type of packing is disclosed in U.S. Pat. No. 4,296,050 (Meier). However, the flow of both liquid and vapor in such packing is largely confined to the space between the sheets. This packing lacks symmetry and thus the flow characteristics are highly non-isotropic. Liquid and vapor introduced between a pair of sheets tend to stay confined between that pair of sheets. A solution to this is to rotate successive layers of the structured packing sheets, typically by an angle of 90°. However, since each rotation increases the pressure drop and reduces the capacity of the packing, the frequency of rotations must be limited.

Attempts have been made in the past to produce a packing which leads to more isotropic fluid flow through a column including such packing. One example is grid-type packing which requires very labor-intensive assembly and is sometimes lacking in mechanical strength. A second example, Optiflow™ packing made by Sulzer, is a modified type structured packing for which three references are cited in the next paragraph. Optiflow uses horizontally or vertically placed corrugation type packing having large cutouts in sheets that must be very carefully laid out and aligned in such a way that upflowing vapor will undergo vortex motion in a clockwise direction in some parts of a column and in a counter-clockwise direction in other parts of the column. The sheets also form rhomboid shaped strips to mix and spread liquid repeatedly. The nature of the liquid flow and the vortex inducing action are claimed to be beneficial in heat and mass exchange and static mixing operations. But the nature of Optiflow surfaces and manufacturing techniques restricts that packing to a limited set of configurations. Also, the assembly of the individual corrugations is labor intensive due to the need for each adjacent sheet to be aligned precisely. Some of the patents for Optiflow are discussed below.

U.S. Pat. No. 4,830,792 (Wilhelm) discloses the use of horizontally superposed layers of packing, each of which is provided with adjacent pyramidal formations. Alternating fan-blade like structures are thereby formed which impart a vortex motion to ascending vapor in both clockwise and counterclockwise directions. U.S. Pat. Nos. 5,158,712 (Wilhelm) and 5,500,160 (Suess) disclose similar layers of packing. However, the configurations and symmetry which can be provided by stacking these prior art layers of packing are limited.

It also is well-known in the prior art that mesh type packing helps spread liquid efficiently and gives good mass transfer performance, but mesh type packing is much more expensive than most foil type packing.

It is desired to have a structured packing with improved spreading properties that will allow free flow of liquid and vapor in both orthogonal directions in the plane of a column without imposing any additional pressure drop penalty on the system. It is desired further to have a specific structured packing that shows high performance characteristics for cryogenic applications, such as those used in air separation, and for other heat and/or mass transfer applications.

BRIEF SUMMARY OF THE INVENTION

The present invention relates to horizontal structured packing utilizing offset horizontal panels or horizontal corrugated foils arranged in a crisscrossing pattern. The present invention also relates to methods for manufacturing and assembling the horizontal structured packing in an exchange column.

In a first embodiment, the structured packing comprises at least one first layer in a generally horizontal first plane and at least one second layer in a generally horizontal second plane below the first layer, each layer having at least one generally horizontal panel in the shape of a polygon having a center. Each panel is substantially uniform in size and of a shape that nests with horizontally adjacent panels, and each panel has a plurality of vanes disposed inside the panel. At least one of the vanes is at an angle to the horizontal and has a passage between said vane and an adjacent vane. The center of at least one panel in the second layer is horizontally offset from the center of a vertically adjacent panel in the first layer.

The panels in the first embodiment may be in the shape of a hexagon, a triangle, a square, or a quadrilateral other than a square. The panels also may take the shape of other polygons, if the panels having such shapes will nest with horizontally adjacent panels.

In a second embodiment, the structured packing comprises at least one first layer in a generally horizontal first plane and at least one second layer in a generally horizontal second plane below the first layer, each layer having a plurality of horizontal panels in the shape of polygons which nest with horizontally adjacent panels. The panels include at least one generally horizontal first panel of a substantially uniform first size and in the shape of a first polygon and at least one generally horizontal second panel of a substantially uniform second size and in the shape of a second polygon. Each first and second panel nests with horizontally adjacent panels. Each panel has a center and a plurality of vanes disposed inside the panel. At least one of the vanes is at an angle to the horizontal and has a passage between said vane and an adjacent vane. Either the center of at least one first panel in the second layer is horizontally offset from the center of a vertically adjacent first panel in the first layer, or the center of at least one second panel in the second layer is horizontally offset from the center of a vertically adjacent second panel in the first layer.

In the second embodiment, the first polygon may be an octagon and the second polygon may be a square. Other combinations of nesting panels having the shapes of other first and second polygons are possible (e.g., rectangles and squares).

In a third embodiment, the structured packing comprises at least one generally horizontal first circular panel and at least one generally horizontal second circular panel, the second circular panel being positioned below the first circular panel. Each panel is substantially uniform in size and has a plurality of vanes disposed inside the panel. At least one of the vanes is at an angle to the horizontal and has a passage between said vane and an adjacent vane. The first and second circular panels are rotated relative to each other by α degrees about a vertical axis which passes through the centers of the first and second circular panels, where α represents a degree of rotation between 0° and 360°.

In a fourth embodiment, the structured packing comprises at least one generally horizontal first panel and at least one generally horizontal second panel, the second panel being positioned below the first panel. Each panel is substantially uniform in size and in the shape of an equilateral polygon (a polygon having congruent sides) having a center and n sides and corners, where n represents an integer greater than 2. Each panel has a plurality of vanes disposed inside the panel, and at least one of the vanes is at an angle to the horizontal and has a passage between said vane and an adjacent vane. The first and second panels are rotated relative to each other by α degrees about a vertical axis which passes through the centers of the first and second panels, where α represents a degree of rotation between (360÷n) degrees and [360−(360÷n)] degrees such that the corners of the first and second panels are substantially aligned.

The panels in the fourth embodiment may be in the shape of a regular hexagon, a regular triangle, a square, or an equilateral quadrilateral other than a square. The panels also may take the shape of other polygons, if the panels having such shapes will nest with horizontally adjacent panels. A polygon is regular if its sides are congruent and its interior angles are congruent.

A fifth embodiment of the present invention is a layer of structured packing. The layer comprises a plurality of horizontally adjacent blocks of structured packing as described in the fourth embodiment above. Each block is substantially uniform in size and shape and has a top and a bottom and a substantially uniform horizontal cross-section throughout the block in the shape of a polygon which nests with horizontally adjacent blocks. The top of each horizontally adjacent block is in a generally horizontal plane.

A sixth embodiment is an assembly of the layers described in the fifth embodiment above. The assembly comprises at least one first layer of structured packing as described in the fifth embodiment above and at least one second layer of structured packing as described in the fifth embodiment below the first layer. The center of at least one panel at the top of at least one block in the second layer is horizontally offset from the center of a vertically adjacent panel at the bottom of a block in the first layer.

A seventh embodiment involves another type of layer of structured packings. The layer comprises a plurality of horizontally adjacent blocks of structured packings as described in the fourth embodiment above. Each block has a top and a bottom and a substantially uniform horizontal cross-section throughout the block in the shape of a polygon which nests with horizontally adjacent blocks. The top of each horizontally adjacent block is in a generally horizontal first plane, and the bottom of each horizontally adjacent block is in a generally horizontal second plane. The blocks include at least one first block having a horizontal cross-section in the shape of a first polygon and at least one second block having a horizontal cross-section in the shape of a second polygon. The first block comprises a first structured packing of the type described in the fourth embodiment above. The second block comprises a second structured packing of the type described in the fourth embodiment above.

An eighth embodiment is an assembly of layers of the type described in the seventh embodiment above. The assembly comprises at least one first layer of structured packings as described in the seventh embodiment and at least one second layer of structured packings as described in the seventh embodiment below the first layer. Either the center of at least one panel at the top of at least one first block in the second layer is horizontally offset from the center of a vertically adjacent panel at the bottom of a first block in the first layer, or the center of at least one panel at the top of at least one second block in the second layer is horizontally offset from the center of a vertically adjacent panel at the bottom of a second block in the first layer.

In all of the above-described embodiments, substantially all of the vanes are at an angle to the horizontal, there being a passage formed between each vane and an adjacent vane. The angle relative to the horizontal of the vanes preferably is substantially 45°. However, the angle may be in the range of 20° to 80°.

The vanes, which have a plurality of edges, may take various shapes. For example, the edges may be straight or wavy. The vanes may be solid or may have apertures. Also, the surfaces of the vanes may be plain or textured. For example, one or more surfaces may be textured with striations.

The angle to the horizontal of the vanes in the first layer may be substantially the same as the angle to the horizontal of the vanes in the second layer. However, that is not necessary. In some embodiments, the angle to the horizontal of the vanes in the first layer may differ from the angle to the horizontal of the vanes in the second layer (i.e., the angles may not be substantially the same).

Also, in each of the preceding eight embodiments, surface texture may be applied on at least a portion of the surfaces of the foils. This may be a bidirectional surface texture applied in crisscrossing relation. The bidirectional surface texture may comprise a plurality of generally parallel bands of generally horizontal striations and a plurality of generally parallel bands of generally vertical striations. Alternatively, the surface texture may be in the form of generally parallel bands of generally horizontal striations.

In a ninth embodiment, the structured packing comprises at least one first corrugated foil in a generally horizontal first plane and at least one second corrugated foil in a generally horizontal second plane below the first corrugated foil. Each corrugated foil has at least one aperture and has a plurality of corrugations regularly spaced and in a substantially parallel relationship. The longitudinal axis of the corrugations of the second corrugated foil is at an angle to the longitudinal axis of the corrugations of the first corrugated foil. In one embodiment, that angle is 90°.

In a preferred embodiment of the ninth embodiment, there are many apertures in the corrugated foils. The apertures may take various shapes, such as circles, ellipses, or polygons. The edges of the apertures may be straight (and smooth) or the edges may be serrated (or wavy, jagged, rough, or saw toothed).

Another aspect of the present invention is an exchange column for exchanging heat and/or mass between a first phase and a second phase, the exchange column having at least one structured packing according to the present invention, as described in the embodiments discussed above.

In one variation, the exchange column may have at least one layer of structured packing according to the present invention. For example, there may be a layer of structured packing such as that described in the fifth embodiment above, or there may be a layer of structured packing such as that described in the seventh embodiment above.

In another variation, the exchange column may have at least one assembly of layers of structured packing according to the present invention. For example, there may be an assembly of layers described in the sixth embodiment above, or there may be an assembly of layers as described in the eighth embodiment above.

In another aspect of the present invention, there is provided a process for cryogenic air separation comprising contacting vapor and liquid counter-currently in at least one distillation column containing at least one mass transfer zone wherein liquid-vapor contact is established by at least one structured packing according to the present invention, as described in the embodiments discussed above.

In one variation, liquid-vapor contact is established in the process for cryogenic air separation by at least one layer of structured packing according to the present invention. For example, there may be a layer of structured packing such as that described in the fifth embodiment above, or there may be a layer of structured packing such as that described in the seventh embodiment above.

In another variation, liquid-vapor contact is established in the process for cryogenic air separation by at least one assembly of layers of structured packing according to the present invention. For example, this may be an assembly of layers such as that described in the sixth embodiment above, or there may be an assembly of layers such as that described in the eighth embodiment above.

In yet another aspect of the present invention, there is provided a process for exchanging mass and/or heat between two liquids, comprising contacting said liquids in at least one exchange column wherein liquid-liquid contact is established by at least one structured packing according to the present invention, as described in the embodiments discussed above. In one embodiment, the liquids flow co-currently in the exchange column. In another embodiment, the liquids flow counter-currently in the exchange column.

In one variation, the liquid-liquid contact is established by at least one layer of structured packing according to the present invention. For example, there may be a layer of structured packing such as that described in the fifth embodiment above, or there may be a layer of structured packing such as that described in the seventh embodiment above. In one embodiment, the liquids flow co-currently in the exchange column. In another embodiment, the liquids flow counter-currently in the exchange column.

In another variation, the liquid-liquid contact is established by at least one assembly of layers of structured packing according to the present invention. For example, there may be an assembly of layers as that described in the sixth embodiment above, or there may be an assembly of layers such as that described in the eighth embodiment above. In one embodiment, the liquids flow co-currently in the exchange column. In another embodiment, the liquids flow counter-currently in the exchange column.

The present invention includes various embodiments of methods for: assembling the structured packing in an exchange column; assembling one or more layers of the structured packing in an exchange column; and assembling an assembly of layers of the structured packing in an exchange column.

In a tenth embodiment, the method for assembling structured packing comprises the steps of providing an exchange column, attaching a support grate within the exchange column, installing one or more nesting panels of structured packing to form a first layer of panels above the supporting grate, installing at least one more layer of nesting panels above the first layer to form a packed section and installing a support grate over the packed section. The individual layers in this embodiment may be as described in the first through third embodiments.

In an eleventh embodiment, the method of assembling a block of structured packing comprises the steps of providing a first panel in the form of a polygon, positioning at least one additional panel above it such that the corners of the polygons are substantially aligned with an angle of rotation between 0 and 360 degrees and securing the panels together as a block. The individual panels within these blocks may be as described in the fourth embodiment.

In the twelfth embodiment, the method of assembling a structured packing comprises the steps of providing an exchange column, attaching a packing support grate within the exchange column, forming blocks as in the eleventh embodiment, installing at least one or more nesting blocks to form a first layer of blocks above the support grate, installing at least one layer of nesting block above the first layer to form a packed section and installing a support grate over the packed section. The blocks in this embodiment may be as described in the fifth through the eighth embodiments.

BRIEF DESCRIPTION OF SEVERAL VIEWS OF THE DRAWINGS

Embodiments of the invention will now be described by way of example with reference to the accompanying drawings, in which:

FIG. 2A is a plan view and FIG. 2B is an elevation of a square horizontal panel with vanes tilted to the horizontal by an angle as shown in FIG. 2B;

FIG. 2C illustrates layers of structured packing in a column wherein panels in successive levels are offset;

FIG. 4A, for example, illustrates the plan view of a panel which could have a vane structure as depicted in FIG. 4B or 4C;

FIGS. 7A–7F illustrate variations in vane structure in circular panels; FIG. 7A, for example, shows the plan view of a panel wherein the vane structure could be as depicted in FIGS. 7B or 7C;

FIG. 7G shows an assembled block of circular panels;

FIGS. 7H–7J illustrate some variations of vane structure in circular panels;

DETAILED DESCRIPTION OF THE INVENTION

Figure 1:
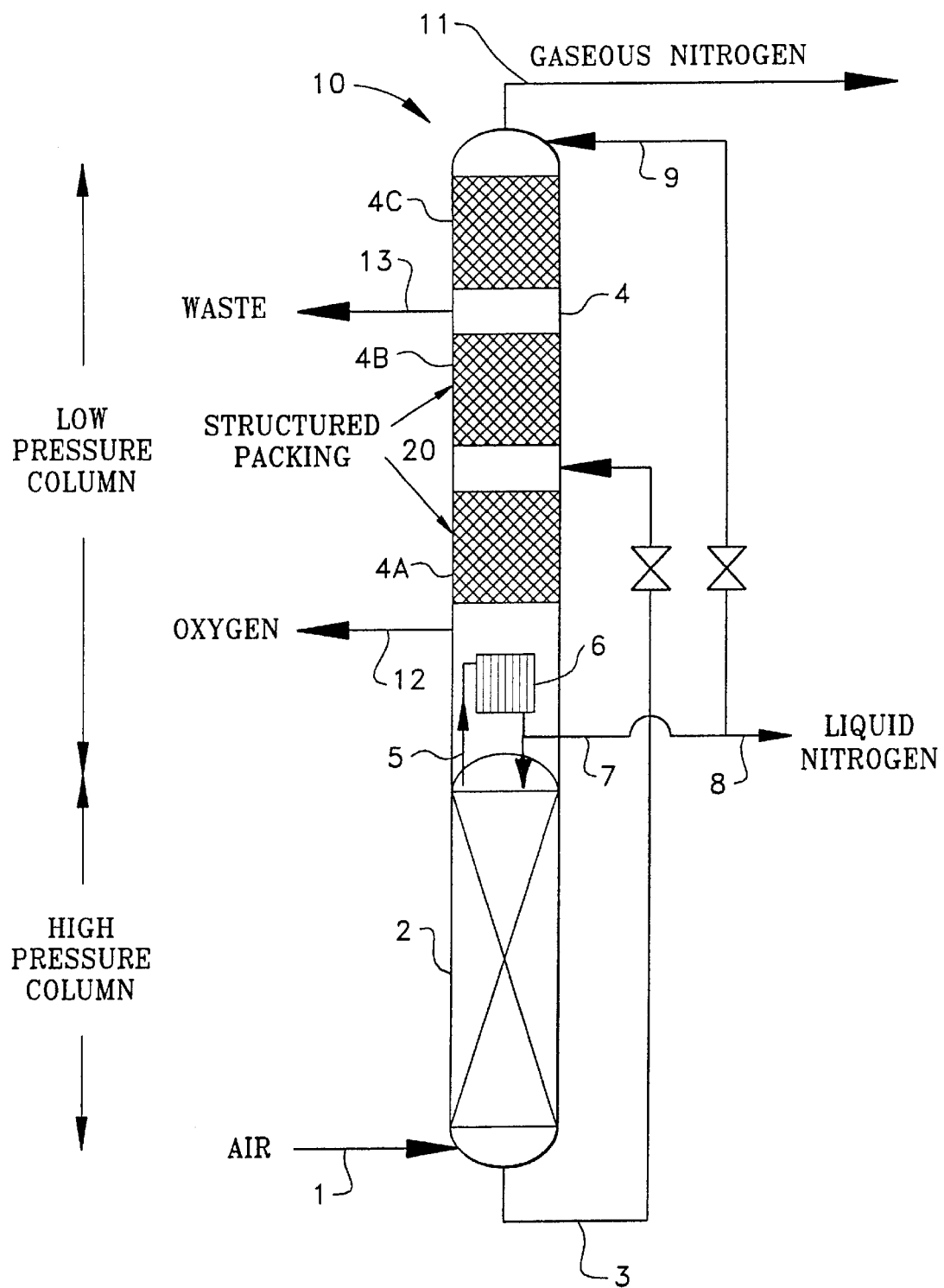
FIG. 1 is a schematic elevation of an air separation unit.

The present invention relates to horizontal structured packing and methods for manufacturing and assembling such packing in an exchange column. The structured packing includes layers of horizontal panels in an offset arrangement or horizontal corrugated foils arranged in a crisscrossing pattern. Variations in the structure and the assembly of the panels and foils are shown in the accompanying drawings.

FIGS. 2A–2C illustrate one embodiment of a panel 22 and the offset arrangement of layers (32, 32') of such panels 22 in successive levels of structured packing in an exchange column 24. This type of arrangement is for use in large distillation columns having a diameter of approximately more than one meter.

Although the panel 22 illustrated in FIG. 2A is square, the panels may take the shape of other polygons, including but not limited to triangles, hexagons, octagons, and quadrilaterals other than squares, such as the quadrilaterals shown in FIGS. 10A–10D.

The panel 22 has a plurality of vanes 26 disposed inside the panel. In the preferred embodiment, the vanes are mounted on support ribs 28. The vanes are titled to the horizontal by an angle, as shown in FIG. 2B. This angle is nominally 45°, but it may be in the range of 20°–80°. In a typical distillation application, liquid flows on the surfaces of the vanes 26 and vapor flows through the passages of open areas 30 between adjacent vanes.

Figure 3C:
FIGS. 3C–3H illustrate variations in surface texture, apertures, and edge shape (i.e., wavy versus straight) for the vanes that are disposed inside panels.
Figure 3D:
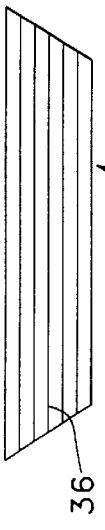
Figure 3E:
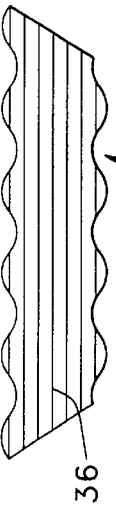
Figure 3F:
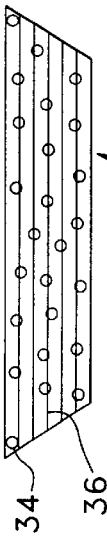
Figure 3G:
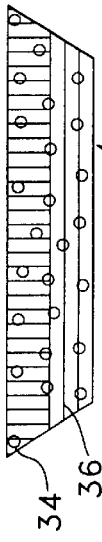
Figure 3H:
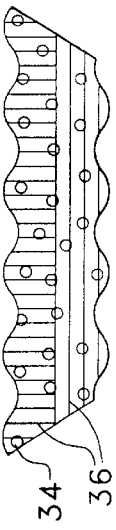
Figure 3A:
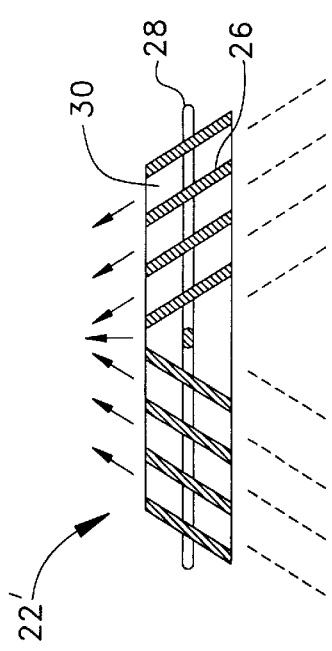
FIGS. 3A and 3B are elevations of two different panels illustrating how the direction of vapor flow is determined by the position of the vanes in a panel.
Figure 3B:
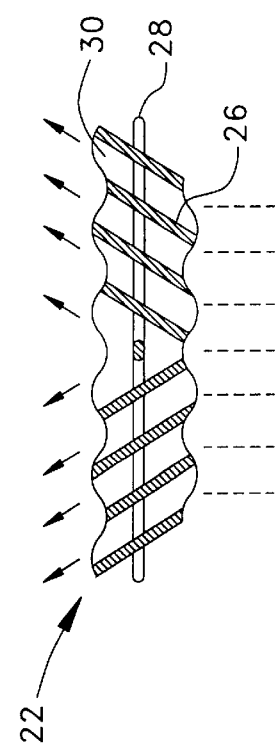

Vanes 26 within panels 22 may point in different directions, as shown in FIGS. 3A and 3B. In FIG. 3A, vapor entering from the bottom of the panel 22' tends to flow inward and up, whereas vapor entering from the bottom of the panel 22 in FIG. 3B tends to flow outward and up. Successive layers (32, 32') of panels may be stacked so that alternation between "outward" panels 22 and "inward" panels 22' occurs every 1 or 2 or 3 or 4 . . . layers. The specific arrangement selected will be determined by optimization in terms of pressure drop and mixing.

The surfaces of the vanes 26 may be plain and solid. Alternatively, as shown in FIGS. 3F–3H, the vanes may have apertures 34, and as shown in FIGS. 3C–3H, surface texture 36 may be applied to the vanes. Also, as shown in FIGS. 3E and 3H, some of the vane surfaces may be wavy rather than straight (i.e., smooth). It is believed that wavy edges induce multiple drip points as the liquid descends from one panel 22 to the next panel below.

Although the apertures 34 are circular in the vanes shown in FIGS. 3F–3H, other shapes (e.g., ellipses, polygons, etc.) may be used.

It is not necessary for the vanes 26 in a given panel 22 to point in the four directions in four quarter segments as shown in FIG. 2A. Many other arrangements are possible. For instance, all of the vanes 26 could be titled in the same direction in the entire panel 22.

As shown in FIG. 2C, the structured packing in one embodiment of the present invention comprises a first layer 32 in a generally horizontal first plane at panel level n and a second layer 32' in a generally horizontal second plane above or below the first layer at panel level n−1 or level n+1, where n represents an integer. (The layer at panel level n is a general layer, and the layer at panel level n−1 or level n+1 represents an adjacent layer above or below the layer at panel level n.) Each layer (32, 32') has at least one generally horizontal panel 22 in the shape of a polygon which will "nest" (i.e., fit together) with horizontally adjacent panels.

In one embodiment, each panel 22 is substantially the same in shape and size (i.e., uniform) as the other panels, and there are a plurality of vanes 26 disposed inside each panel, as shown in the panels illustrated in FIGS. 2A–2C. However, in other embodiments, the panels may take the shapes of mixed polygons (e.g., squares and octagons) that nest.

Figure 9A:
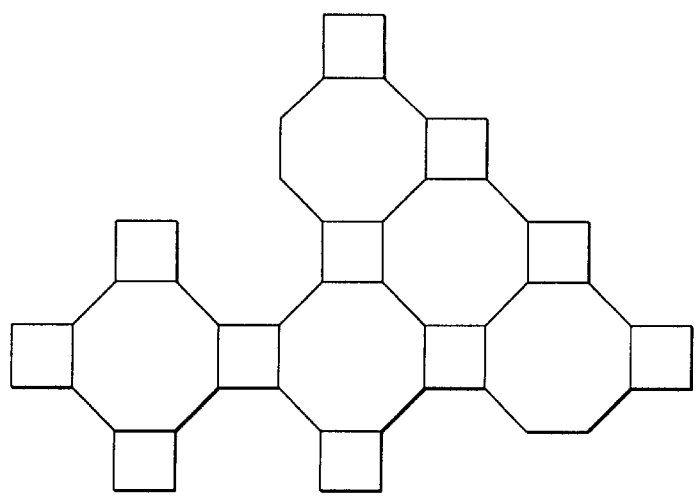
FIGS. 9A–9D illustrate the nesting of horizontal panels having the shapes of different types of polygons.
Figure 9B:
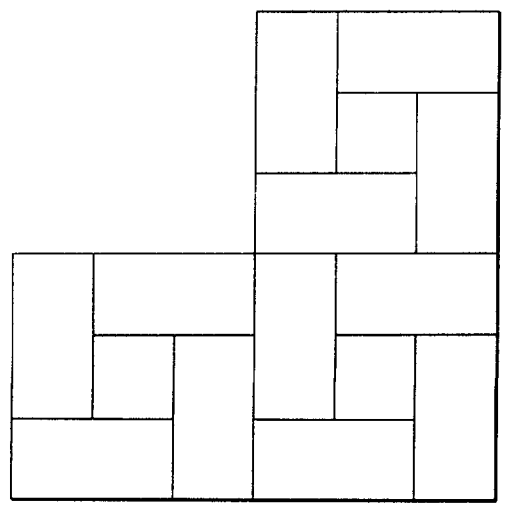
Figure 9C:
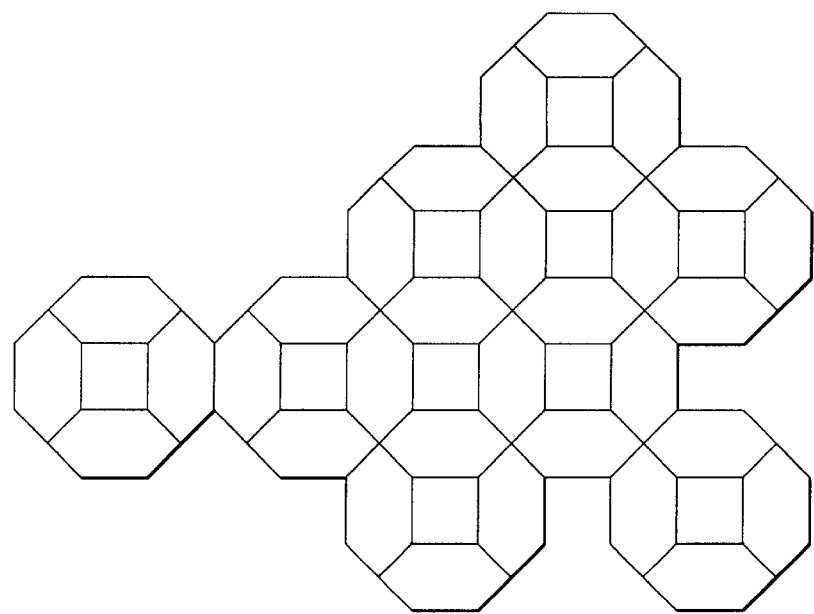
Figure 9D:
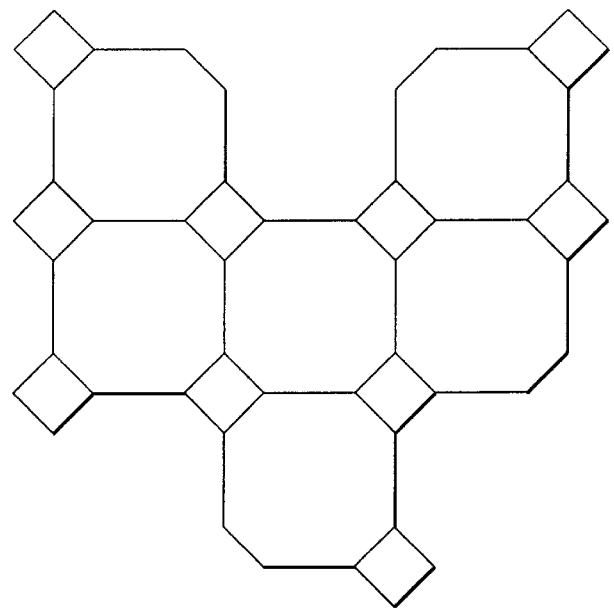
Figure 10A:
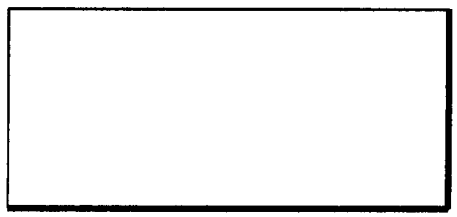
FIGS. 10A–10D illustrate some variations in the shapes (quadrilaterals) which may be taken by the horizontal panels in the layers shown in FIG. 2C.
Figure 10B:
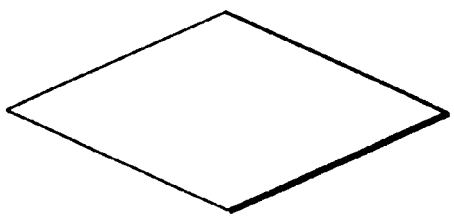
Figure 10C:
Figure 10D:
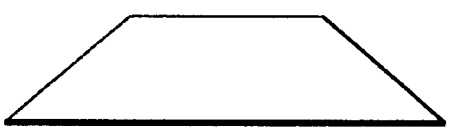

Several "nested" arrangements of mixed polygons are illustrated in FIGS. 9A–9D. In FIGS. 9A, 9C and 9D, the polygons are octagons and squares, and in FIG. 9B the polygons are rectangles and squares. Other combinations of different nesting shapes are possible. As previously indicated, a layer 32 of panels 22 may comprise panels all having the same shape (e.g.,all triangles, all squares, or all quadrilaterals of a shape other than square). The only requirement is that the panels nest (i.e., fit together without any substantial space between adjacent panels) when arranged in a layer.

Although it would be possible to construct layers of packing using panels that do not nest, such an arrangement would not provide for desirable performance.

Panels 22 in the layers (32, 32') at successive levels are offset as shown in FIG. 2C to maximize spreading of liquid and vapor in both orthogonal directions in the horizontal plane.

Each layer (32, 32') inside a column 24 is packed with panels 22 like tiles on a floor. The sections near the column wall are made by cutting from full sized panels. It may be necessary to install special wipers on the sections, depending on the nature of the contact made with the inner wall of the column.

Structured packing arranged in this manner allows the liquid flow and vapor flow to turn directions every few millimeters, as opposed to every 200 mm or so as in the prior art. Isotropic flow across the column cross-section may be achieved using the packing of the present invention. The entire arrangement within a column can be optimized for mass and/or heat transfer for particular applications.

Figure 4A:
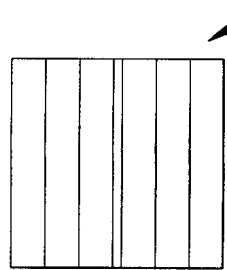
FIGS. 4A–4I illustrate some variations of vane structure in square panels.
Figure 4D:
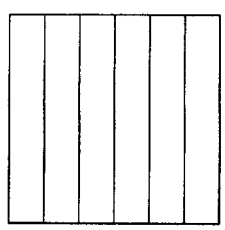
Figure 4G:
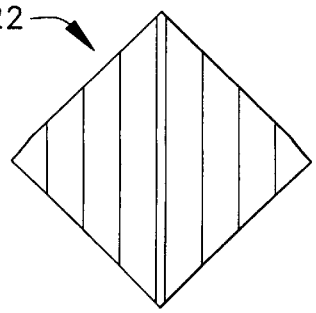
Figure 4B:
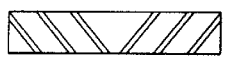
Figure 4E:
Figure 4H:
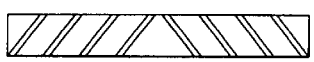
Figure 4C:
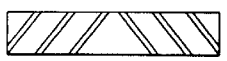
Figure 4F:
Figure 4I:

FIGS. 4A–4I and 5A–5B pertain to another embodiment, wherein the structured packing is assembled by combining panels 22 in blocks 38 to be installed into a column. FIGS. 4A–4I illustrate some variations of vane 26 structure in square panels. For example, FIG. 4A shows the plan view of a panel which could have a vane structure as depicted in FIG. 4B or 4C. FIGS. 4D–4F and 4G–4I show some variations.

The panels 22 may take the shapes of other polygons, such as regular triangles, regular hexagons, and equilateral quadrilaterals.

Figure 5A:
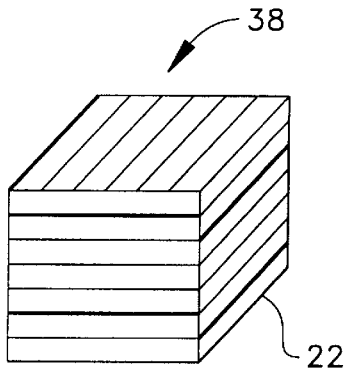
FIG. 5A shows an assembled block of square panels.
Figure 5B:
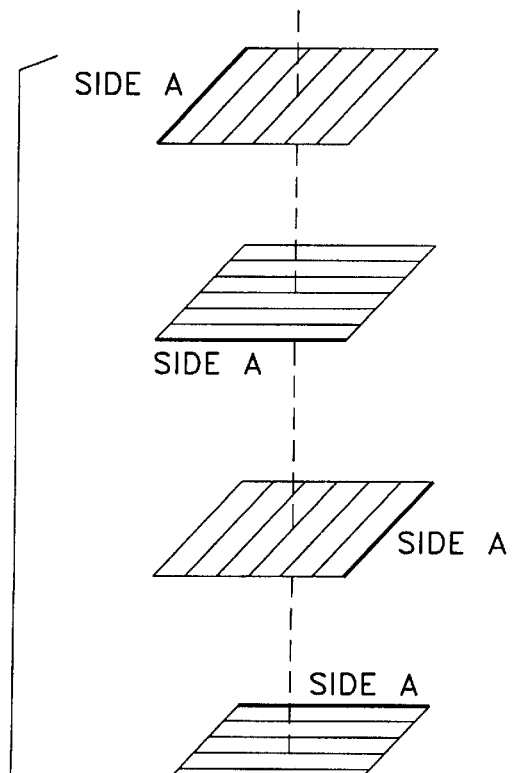
FIG. 5B shows an exploded view of four panels from the block in FIG. 5A, which panels are rotated relative to each other about a vertical axis (wherein the depiction of "Side A" is arbitrary and used only as a reference for clarification)

FIG. 5A shows a block 38 of structured packing made from a combination of panels 22 similar to the square panel shown in FIG. 4D. Successive panels are rotated 90° (360°÷number of sides or corners of the polygon) about the vertical axis passing through the centers of the channels. This is depicted by the darkened lines in FIG. 5A and in FIG. 5B, which shows an exploded view of four panels 22 rotated relative to each other about the vertical axis. "Side A" is arbitrary and used only as a reference point for clarification.

Other variations are possible. In one variation, for example, adjacent panels 22 may not be rotated at all relative to each other (i.e., 0° or 360°). Alternatively, adjacent panels may be rotated at some angle other than (360°÷n), where n represents the number of sides or corners of the polygon (i.e., an integer greater than 2). In this case, the degree of rotation ($\alpha$) is between (360÷n) degrees and [360−(360÷n)] degrees such that the corners of the panels are substantially aligned. For a square, the possible angles of rotation are 90°, 180°, and 270°; for a hexagon, it would be 60°, 120°, 180°, 240°, and 300°. (No rotation is 0° or 360°.)

Also, the panels 22 which are rotated need not be rotated in the same direction. For example, some panels may be rotated clockwise relative to each other, while other panels may be rotated counterclockwise relative to each other.

Once assembled, the blocks 38 are installed as structured packing in a column. Sections near the column wall are filled with blocks made from panels 22 of the shapes needed to complete the cross-section.

Figure 6A:
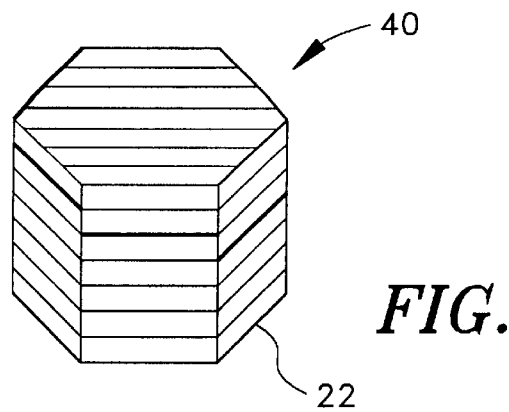
FIG. 6A shows an assembled block of hexagonal panels.
Figure 6B:
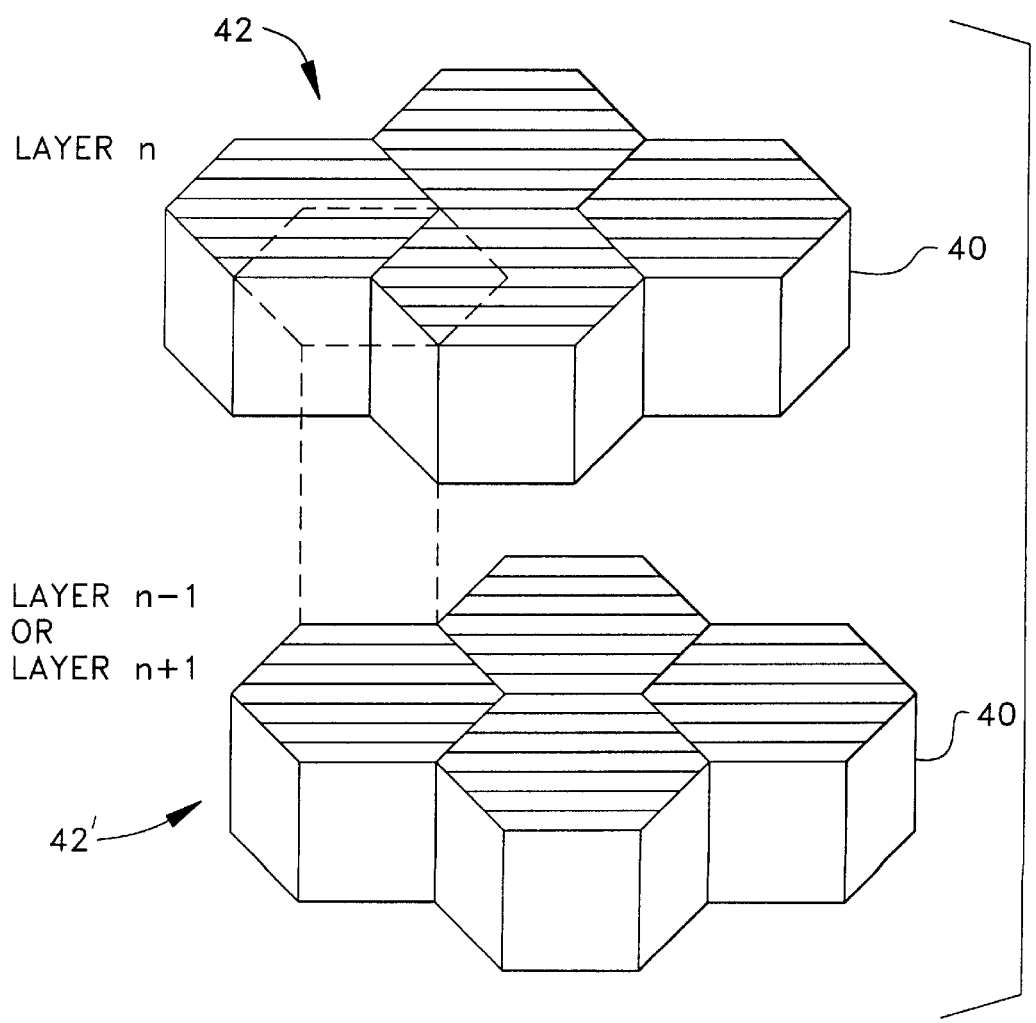
FIG. 6B illustrates the formation of portions of layers of structured packing using blocks of hexagonal panels such as shown in FIG. 6A, wherein successive layers are offset relative to each other.

FIG. 6A illustrates an embodiment where the panels 22 are hexagonal, rather than square, and hexagonal blocks 40 are preassembled to be packed into a column. The individual panels are rotated by 60° relative to each other as shown by the darkened lines in FIG. 6A. Once assembled, the hexagonal blocks 40 may be used to form layers (42, 42'), as shown in FIG. 6B. Successive layers may be offset relative to each other, as indicated by the dotted lines in FIG. 6B.

Persons skilled in the art will recognize that such layers (42, 42') may also be made from blocks 40 of panels 22 which take the shapes of other polygons, such as regular triangles or equilateral quadrilaterals. Layers also may be constructed from blocks of panels having the shapes of mixed polygons which nest, such as octagons and squares, as shown in FIG. 9A. FIGS. 9B–9D illustrate other mixed polygons which nest and could be used for the shapes of panels. It is possible to have many other combinations of nesting polygons of these and other shapes in various arrangements. Although the illustrations show the nesting of only two types of polygons (e.g., squares and octagons; or squares and rectangles) of uniform size, other combinations may be used. For example, it is also possible to nest polygons of three or more different shapes. In addition, it is possible to nest mixed polygons of non-uniform sizes (i.e., smaller and larger sizes) regardless of whether the polygons have the same or different shapes.

FIGS. 7A–7F and 7H–7J pertain to circular panels 44 used for filling small diameter columns (i.e., less than approximately one meter). A plurality of circular panels are assembled into a cylindrical block 46 as shown in FIG. 7G. Since the block has a circular cross-section, successive panels may be rotated at any angle between 0° and 360°.

FIGS. 7A–7F illustrate variations in vane 26 structure in circular panels 44. For example, FIG. 7A shows the plan view of a panel wherein the vane structure could be as depicted in FIGS. 7B or 7C. FIGS. 7H–7J illustrate some other variations of vane structure in circular panels.

Figure 8A:
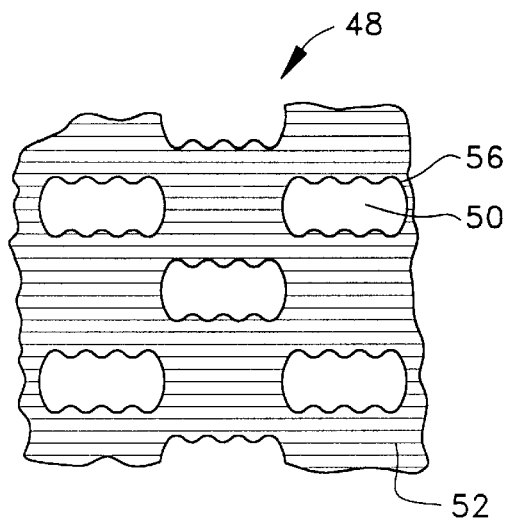
FIG. 8A is a plan view of a foil having apertures prior to being corrugated.
Figure 8B:
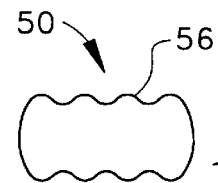
FIGS. 8B–8F illustrate some variations in the shapes which may be taken by the apertures in the foil shown in FIG. 8A.
Figure 8C:
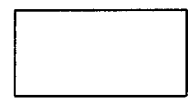
Figure 8D:
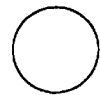
Figure 8E:
Figure 8F:
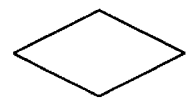
Figure 8G:
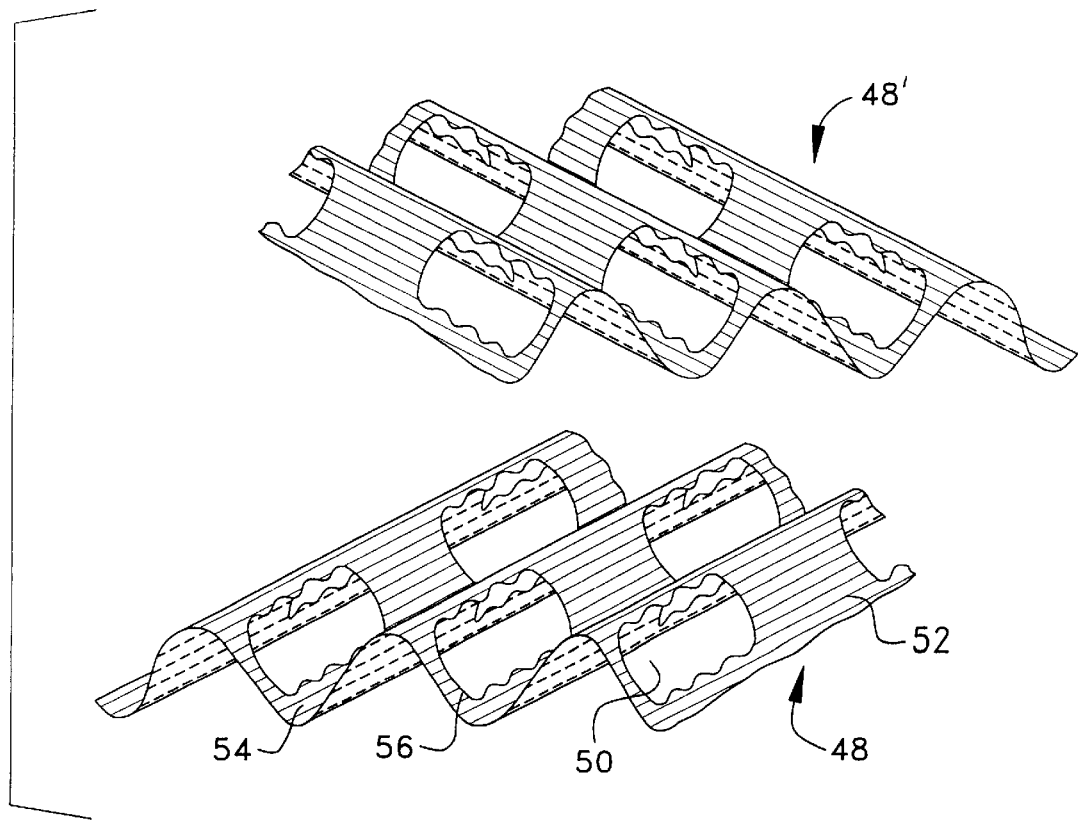
FIG. 8G is a perspective view of corrugated foils in a crisscrossing arrangement.

FIGS. 8A–8G pertain to another embodiment of horizontal structured packing of the present invention. Rather than the panels (22, 44) used in the previously discussed embodiments, this embodiment utilizes horizontal corrugated foils (48, 48') arranged in a crisscrossing pattern, as illustrated in FIG. 8G.

A typical foil 48 is shown in FIG. 8A as it would appear prior to being corrugated. The apertures 50 in the foil represent the only pathway for vapor flow. FIGS. 8B–8F show some variations in the shape of apertures that may be used for this purpose.

The surfaces of the foils (48, 48') may be plain (i.e., smooth) or may have a surface texture 52 applied to all or a portion of the foil surfaces. The surface texture may be a bidirectional surface texture applied in a crisscrossing relation, such as a plurality of generally parallel bands of generally horizontal striations and a plurality of generally parallel bands of generally vertical striations. Alternately, the surface texture may be in the form of generally parallel bands of generally horizontal striations.

As indicated, successive layers of foils (48, 48') are assembled for installation in a column arranged so that the corrugations run in a crisscrossing fashion. The angle between the corrugations may be 90°, but other angles may be used.

The vapor velocity will depend on the angle that the foil surfaces form with the vertical. In the preferred embodiment, this angle is nominally 45° but other angles may be advantageous in optimizing pressure drop or capacity versus mass transfer performance.

Wipers should not be needed for this embodiment of horizontal structured packing. Corrugations can be cut in such a manner for the sections near the column wall so that the liquid will be swept off. Also, because there are so many layers, there is a potential wiper every few millimeters as opposed to every 100 mm in the prior art packing. Therefore, wiping action does not have to be as precise.

The structured packing promotes the ability of vapors and liquids to spread in the horizontal direction while flowing in a generally countercurrent direction relative to each other within a column. The horizontal structured packing of the present invention allows the flow to turn directions every few millimeters as opposed to every 200 mm in the prior art packing. Also, the horizontal structured packing of the present invention may be installed so that isotropic flow is approached across the column cross-section.

Also, the hold-up of liquid is enhanced by a significant factor over the prior art packing. This is because a liquid, after flowing down the sides of the corrugations, collects in the troughs 54 and overflows through the apertures 50. The troughs also allow for flow across in the horizontal direction for some local mixing of liquid and pressure equalization of vapor.

If the packing in this embodiment of horizontal structured packing is out of level, there may be some maldistribution of flow. However, this can be alleviated by serrated (or wavy, jagged, rough, or saw toothed) edges 56 on the apertures 50, as shown in FIGS. 8A, 8B and 8G. The serrated edges increase the drip point density of the liquid by overflow.

Manufacture of each horizontal corrugated foil 48 begins with a plain foil. The foil is perforated to form apertures 50, and surface texture 52 is applied by embossing. In either a single step or multiple steps, stamping is used to form the corrugated structure and to finish the edges 56 of the apertures in the desired shapes. Layers of the corrugated foils may be assembled individually in an exchange column. Alternatively, they may be pre-assembled into blocks and the blocks assembled in an exchange column.

According to the present invention, horizontal panels (22, 44) or horizontal corrugated foils 48 are used in the horizontal structured packing as shown in the attached figures. As a column is packed, the panels (22, 44) are placed in an offset pattern, or the corrugated foils are placed in a crisscrossing pattern. The benefits of horizontal structured packing are spreading of liquid and vapor in both orthogonal directions in the horizontal plane, thin liquid film mass transfer, and an arrangement that induces adjacent packets of vapor to flow in a crisscrossing, and therefore a vortex mixing, pattern. Compared to the prior art, the present invention allows for much more frequent layer rotation, by a factor of up to 50, without adding much more pressure drop. Also, the liquid hold-up can be increased by a factor of 2–5 over prior art packing. The present invention also has advantages over the prior art in mass transfer efficiency relative to capacity and pressure drop, as well as cost.

Various embodiments of the present invention have been described with particular reference to the examples illustrated. However, it will be appreciated that variations and modifications may be made to the examples as described within the scope of the appended claims.

I claim:

1. A structured packing comprising a layer in a generally horizontal plane and at least one additional layer in a generally horizontal plane below the first layer, each layer having at least one generally horizontal panel of a size and shape which nests with horizontally adjacent panels, each panel having a center and a plurality of vanes disposed inside the panel, at least one of the vanes being at an angle to the horizontal and having a passage between said vane and an adjacent vane, wherein the center of at least one panel in the additional layer is horizontally offset from the center of a vertically adjacent panel of substantially the same size and shape.

2. A structured packing as in claim 1 wherein substantially all of the vanes are at an angle to the horizontal, there being a passage formed between each vane and an adjacent vane.

3. A structured packing as in claim 1 wherein the angle relative to the horizontal of the vanes is in the range of 20° to 80°.

4. A structured packing as in claim 1 wherein the vanes have a textured surface.

5. A structured packing as in claim 1 wherein the vanes have apertures.

6. A structured packing as in claim 1 wherein the angle to the horizontal of the vanes in substantially all of the panels in the first layer is substantially the same as the angle to the horizontal of the vanes in substantially all of the panels in the additional layer.

7. A structured packing as in claim 1 wherein the angle to the horizontal of the vanes in substantially all of the panels in the first layer is not substantially the same as the angle to the horizontal of the vanes in substantially all of the panels in the additional layer.

8. An exchange column for exchanging heat and/or mass between a first phase and a second phase, the exchange column having at least one structured packing as in claim 1.

9. A process for cryogenic air separation comprising contacting vapor and liquid counter-currently in at least one distillation column containing at least one mass transfer zone wherein liquid-vapor contact is established by at least one structured packing as in claim 1.

10. A structured packing comprising at least one first layer in a generally horizontal first plane and at least one second layer in a generally horizontal second plane below the first layer, each layer having at least one generally horizontal panel in the shape of a polygon having a center, each panel being substantially uniform in size and of a shape that nests with horizontally adjacent panels, each panel having a plurality of vanes disposed inside the panel, at least one of the vanes being at an angle to the horizontal and having a passage between said vane and an adjacent vane, wherein the center of at least one panel in the second layer is horizontally offset from the center of a vertically adjacent panel in the first layer.

11. A structured packing as in claim 10 wherein the polygon is a square.

12. A structured packing as in claim 10 wherein the polygon is a hexagon.

13. A structured packing as in claim 10 wherein the polygon is a triangle.

14. A structured packing as in claim 10 wherein the polygon is a quadrilateral other than a square.

15. A structured packing comprising at least one first layer in a generally horizontal first plane and at least one second layer in a generally horizontal second plane below the first layer, each layer having a plurality of horizontal panels in the shape of polygons which nest with horizontally adjacent panels, wherein the panels include at least one generally horizontal first panel of a substantially uniform first size and in the shape of a first polygon and at least one generally horizontal second panel of a substantially uniform second size and in the shape of a second polygon, wherein each first and second panel nests with horizontally adjacent panels, each panel having a center and a plurality of vanes disposed inside the panel, at least one of the vanes being at an angle to the horizontal and having a passage between said vane and an adjacent vane, wherein either the center of at least one first panel in the second layer is horizontally offset from the center of a vertically adjacent first panel in the first layer or the center of at least one second panel in the second layer is horizontally offset from the center of a vertically adjacent second panel in the first layer.

16. A structured packing as in claim 15 wherein the first polygon is an octagon and the second polygon is a square.

17. A structured packing comprising at least one generally horizontal first panel and at least one generally horizontal second panel positioned below the first panel, each panel having a center and being substantially uniform in size and shape and having a plurality of vanes disposed inside the panel, at least one of the vanes being at an angle to the horizontal and having a passage between said vane and an adjacent vane, wherein the first and second panels are rotated relative to each other by $\alpha$ degrees about a vertical axis which passes through the centers of the first and second panels, where a represents a degree of rotation between 0° and 360°.

18. A structured packing as in claim 17 wherein each panel is circular.

19. A structured packing as in claim 17 wherein substantially all of the vanes are at an angle to the horizontal, there being a passage formed between each vane and an adjacent vane.

20. A structured packing as in claim 17 wherein the angle relative to the horizontal of the vanes is in the range of 20° to 80°.

21. A structured packing as in claim 17 wherein the vanes have a textured surface.

22. A structured packing as in claim 17 wherein the vanes have apertures.

23. A structured packing as in claim 17 wherein the angle to the horizontal of substantially all of the vanes in the first panel is substantially the same as the angle to the horizontal of substantially all of the vanes in the second panel.

24. A structured packing as in claim 17 wherein the angle to the horizontal of substantially all of the vanes in the first panel is not substantially the same as the angle to the horizontal of substantially all of the vanes in the second panel.

25. An exchange column for exchanging heat and/or mass between a first phase and a second phase, the exchange column having at least one structured packing as in claim 17.

26. A process for cryogenic air separation comprising contacting vapor and liquid counter-currently in at least one distillation column containing at least one mass transfer zone wherein liquid-vapor contact is established by at least one structured packing as in claim 17.

27. A structured packing comprising at least one generally horizontal first panel and at least one generally horizontal second panel, the second panel positioned below the first panel, each panel being substantially uniform in size and in the shape of an equilateral polygon having a center and n sides and corners, where n represents an integer greater than 2, each panel having a plurality of vanes disposed inside the panel, at least one of the vanes being at an angle to the horizontal and having a passage between said vane and an adjacent vane, wherein the first and second panels are rotated relative to each other by $\alpha$ degrees about a vertical axis which passes through the centers of the first and second panels, where $\alpha$ represents a degree of rotation between (360÷n) degrees and [360−(360÷n)] degrees such that the corners of the first and second panels are substantially aligned.

28. A layer of structured packing comprising a plurality of horizontally adjacent blocks of structured packing as in claim 27, each block being substantially uniform in size and shape and having a top and a bottom and a substantially uniform horizontal cross-section throughout the block in the shape of a polygon which nests with horizontally adjacent blocks, the top of each horizontally adjacent block being in a generally horizontal plane.

29. A layer of structured packings comprising a plurality of horizontally adjacent blocks of structured packings as in claim 27, each block having a top and a bottom and a substantially uniform horizontal cross-section throughout the block in the shape of a polygon which nests with horizontally adjacent blocks, the top of each horizontally adjacent block being in a generally horizontal first plane and the bottom of each horizontally adjacent block being in a generally horizontal second plane, wherein the blocks include at least one first block having a horizontal cross-section in the shape of a first polygon and at least one second block having a horizontal cross-section in the shape of a second polygon, the first block comprising a first structured packing as in claim 27 and the second block comprising a second structured packing as in claim 27.

30. An assembly of layers of structured packing comprising:

at least one first layer of structured packing comprising a plurality of horizontally adjacent blocks of structured packing as in claim 27, each block being substantially uniform in size and shape and having a top and a bottom and a substantially uniform horizontal cross-section throughout the block in the shape of a polygon which nests with horizontally adjacent blocks, the top of each horizontally adjacent block being in a generally horizontal first plane; and at least one second layer of structured packing comprising a plurality of horizontally adjacent blocks of structured packing as in claim 27 below the first layer, each block being substantially uniform in size and shape and having a top and a bottom and a substantially uniform horizontal cross-section throughout the block in the shape of a polygon which nests with horizontally adjacent blocks, the top of each horizontally adjacent block being in a generally horizontal second plane; wherein the center of at least one panel at the top of at least one block in the second layer is horizontally offset from the center of a vertically adjacent panel at the bottom of a block in the first layer.

31. An assembly of layers of structured packings comprising:

at least one first layer of structured packings comprising a plurality of horizontally adjacent blocks of structured packings as in claim 27, each block having a top and a bottom and a substantially uniform horizontal cross-section throughout the block in the shape of a polygon which nests with horizontally adjacent blocks, the top of each horizontally adjacent block being in a generally first plane and the bottom of each horizontally adjacent block being in a generally horizontal second plane, wherein the blocks include at least one first block having a horizontal cross-section in the shape of a first polygon and at least one second block having a horizontal cross-section in the shape of a second polygon, the first block comprising a first structured packing as in claim 27 and the second block comprising a second structured packing as in claim 27; and at least one second layer of structured packings comprising a plurality of horizontally adjacent blocks of structured packings as in claim 27 below the first layer, each block having a top and a bottom and a substantially uniform horizontal cross-section throughout the block in the shape of a polygon which nests with horizontally adjacent blocks, the top of each horizontally adjacent block being in a generally horizontal third plane and the bottom of each horizontally adjacent block being in a generally horizontal fourth plane, wherein the blocks include at least one first block having a horizontal cross-section in the shape of a first polygon and at least one second block having a horizontal cross-section in the shape of a second polygon, the first block comprising a first structured packing as in claim 27 and the second block comprising a second structured packing as in claim 27;

wherein either the center of at least one panel at the top of at least one first block in the second layer is horizontally offset from the center of a vertically adjacent panel at the bottom of a first block in the first layer or the center of at least one panel at the top of at least one second block in the second layer is horizontally offset from the center of a vertically adjacent panel at the bottom of a second block in the first layer.

32. A structured packing as in claim 27 wherein the polygon is a square.

33. A structured packing as in claim 27 wherein the polygon is a regular hexagon.

34. A structured packing as in claim 27 wherein the polygon is a regular triangle.

35. A structured packing as in claim 27 wherein the polygon is an equilateral quadrilateral other than a square.

36. A structured packing comprising at least one first corrugated foil in a generally horizontal first plane and at least one second corrugated foil in a generally horizontal second plane below the first corrugated foil, each corrugated foil having at least one aperture and having a plurality of corrugations regularly spaced and in a substantially parallel relationship, the corrugations of the first and second corrugated foils having a longitudinal axis, wherein the longitudinal axis of the corrugations of the second corrugated foil is at an angle to the longitudinal axis of the corrugations of the first corrugated foil.

37. A structured packing as in claim 36 wherein the edges of the apertures are serrated.

38. A structured packing as in claim 36 wherein a surface texture is applied on at least a portion of the first and second corrugated foils.

39. A structured packing as in claim 38 wherein the surface texture is a bidirectional surface texture applied in crisscrossing relation.

40. An exchange column for exchanging heat and/or mass between a first phase and a second phase, the exchange column having at least one structured packing as in claim 36.

41. A process for cryogenic air separation comprising contacting vapor and liquid counter-currently in at least one distillation column containing at least one mass transfer zone wherein liquid-vapor contact is established by at least one structured packing as in claim 36.

42. A method for assembling structured packing in an exchange column, comprising the steps of:

providing an exchange column;

attaching a support grate within the exchange column;

installing one or more nesting panels of structured packing to form a first layer of panels above the supporting grate;

installing at least one more layer of nesting panels above the first layer to form a packed section; and installing a support grate over the packed section.

43. A method for assembling structured packing in an exchange column, comprising the steps of:

providing an exchange column;

installing a first panel in the form of a polygon;

positioning at least one additional panel above the first panel such that the corners of the first and second polygon panels are substantially aligned with an angle of rotation between 0 and 360 degrees; and securing the panels together as a block.

44. A method for assembling a structured packing in an exchange column, of claim 43 which further comprises:

installing at least one or more nesting blocks to form a first layer of blocks above the support grate;

installing at least one layer of nesting blocks above the first layer to form a packed section; and installing a support grate over the packed section.

* * * * *

UNITED STATES PATENT AND TRADEMARK OFFICE
CERTIFICATE OF CORRECTION

PATENT NO. : 6,119,481
DATED : Sep. 19, 2000
INVENTOR(S) : Swaminathan Sunder

It is certified that error appears in the above-indentified patent and that said Letters Patent is hereby corrected as shown below:

Column 13, Line 50
  After "where", delete "a" and substitute therefor --α--.

Signed and Sealed this

Twenty-fourth Day of April, 2001

Attest:

NICHOLAS P. GODICI

Attesting Officer     Acting Director of the United States Patent and Trademark Office